(12) United States Patent
Kaneko et al.

(10) Patent No.: US 10,714,770 B2
(45) Date of Patent: Jul. 14, 2020

(54) FUEL CELL SYSTEM

(71) Applicant: TOYOTA JIDOSHA KABUSHIKI KAISHA, Toyota-shi, Aichi-ken (JP)

(72) Inventors: Tomohiko Kaneko, Okazaki (JP); Yoshiaki Naganuma, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 150 days.

(21) Appl. No.: 15/181,809

(22) Filed: Jun. 14, 2016

(65) Prior Publication Data

US 2016/0380285 A1    Dec. 29, 2016

(30) Foreign Application Priority Data

Jun. 24, 2015  (JP) ................................. 2015-126112

(51) Int. Cl.
*H01M 8/04225* (2016.01)
*H01M 8/04828* (2016.01)
(Continued)

(52) U.S. Cl.
CPC ... *H01M 8/04225* (2016.02); *H01M 8/04089* (2013.01); *H01M 8/04701* (2013.01);
(Continued)

(58) Field of Classification Search
CPC ......... H01M 8/04225; H01M 8/04089; H01M 8/04873; H01M 8/04902; H01M 8/04753
See application file for complete search history.

(56) References Cited

U.S. PATENT DOCUMENTS

2007/0248848 A1* 10/2007 Marsh .................... B82Y 30/00
                                                              429/446
2009/0130509 A1    5/2009 Manabe et al.
(Continued)

FOREIGN PATENT DOCUMENTS

CN          101657926 A    2/2010
CN          101755359 A    6/2010
(Continued)

*Primary Examiner* — Robert S Jones
*Assistant Examiner* — Rachel L Zhang
(74) *Attorney, Agent, or Firm* — Finnegan, Henderson, Farabow, Garrett & Dunner, LLP

(57) ABSTRACT

A fuel cell system comprises a fuel cell; a fuel cell controlling converter; an oxidizing gas supplier that is configured to supply an oxidizing gas to the fuel cell; and a controller that is configured to control a voltage and a current value of the fuel cell. In a first power generation state, the controller sets the voltage and the current value of the fuel cell according to a required output, based on a current-voltage characteristic of the fuel cell. In a second power generation state, the controller sets the voltage and the current value of the fuel cell according to the required output and a required amount of heat, to a voltage and a current value that provide a lower power generation efficiency than a power generation efficiency in the first power generation state. The controller reduces the required amount of heat in a process of changing over a power generation state from the second power generation state to the first power generation state. The controller reduces a decrement in the required amount of heat per unit time when the required output is equal to or higher than a reference value, compared with a decrement when the required output is lower than the reference value.

3 Claims, 4 Drawing Sheets

(51) Int. Cl.
  *H01M 8/04746* (2016.01)
  *H01M 8/04089* (2016.01)
  *H01M 8/04858* (2016.01)
  *H01M 8/04701* (2016.01)

(52) U.S. Cl.
  CPC ... *H01M 8/04753* (2013.01); *H01M 8/04865* (2013.01); *H01M 8/04895* (2013.01); *H01M 8/04925* (2013.01); *H01M 2250/20* (2013.01); *Y02T 90/32* (2013.01)

(56) References Cited

U.S. PATENT DOCUMENTS

| | | |
|---|---|---|
| 2009/0148735 A1 | 6/2009 | Manabe et al. |
| 2010/0112402 A1 | 5/2010 | Ogawa |
| 2010/0203409 A1* | 8/2010 | Manabe ............ H01M 8/04268 429/431 |
| 2011/0020719 A1* | 1/2011 | Manabe ............ H01M 8/04589 429/429 |

FOREIGN PATENT DOCUMENTS

| | | |
|---|---|---|
| JP | 2007-149595 | 6/2007 |
| JP | 2007-184243 A | 7/2007 |
| JP | 2008-269813 A | 11/2008 |
| JP | 2009-32605 | 2/2009 |
| KR | 10-2008-0066075 A | 7/2008 |
| KR | 10-2009-0121394 A | 11/2009 |

\* cited by examiner

FUEL CELL SYSTEM

CROSS-REFERENCE TO RELATED APPLICATIONS

The present application claims priority from Japanese patent application No. 2015-126112 filed on Jun. 24, 2015, the content of which is hereby incorporated by reference into this application.

BACKGROUND

Field

The present invention relates to a fuel cell system.

Related Art

Various techniques of warming up a fuel cell to a temperature suitable for power generation have been proposed. For example, a fuel cell system described in JP 2009-32605A causes an operating point of a fuel cell to be deviated from an I-V (current-voltage) characteristic curve in a high-efficiency power generation state of the fuel cell and thereby provides a low voltage and high current state. This changes over the power generation state of the fuel cell to a low-efficiency power generation state to warm up the fuel cell.

When the need for warm-up is eliminated, the power generation state of the fuel cell is changed over from the low-efficiency power generation state of low voltage and high current to the ordinary power generation state of high voltage and low current. In the process of changing over the power generation state, an abrupt increase of the voltage in a short time period may cause an excessive current to flow in a DC-DC converter. A gentle increase of the voltage is accordingly preferable in the process of changing over the power generation state. A gentle increase of the voltage is, however, likely to cause the current value to decrease to a target value even when the voltage has not yet increased to a target value and thereby cause a temporary decrease in the output of the fuel cell. Such a decrease of the output may not be negligible in some use condition of the fuel cell system.

SUMMARY

In order to solve at least part of the above problems, the invention may be implemented by any of the following aspects.

(1) According to one aspect of the invention, there is provided a fuel cell system. This fuel cell system comprises a fuel cell; a fuel cell controlling converter that is connected with the fuel cell; an oxidizing gas supplier that is configured to supply an oxidizing gas to the fuel cell; and a controller that is configured to control a voltage and a current value of the fuel cell by using the fuel cell controlling converter and the oxidizing gas supplier. In a first power generation state, the controller sets the voltage and the current value of the fuel cell according to a required output, based on a current-voltage characteristic of the fuel cell. In a second power generation state, the controller sets the voltage and the current value of the fuel cell according to the required output and a required amount of heat, to a voltage and a current value that provide a lower power generation efficiency than a power generation efficiency in the first power generation state. The controller reduces the required amount of heat in a process of changing over a power generation state from the second power generation state to the first power generation state. In the process of changing over the power generation state from the second power generation state to the first power generation state, the controller reduces a decrement in the required amount of heat per unit time when the required output is equal to or higher than a reference value, compared with a decrement when the required output is lower than the reference value. In the process of changing over the power generation state from the second power generation state to the first power generation state, when the required output is equal to or higher than the reference value, the fuel cell system of this aspect reduces the decrement in the required amount of heat per unit time. This suppresses a temporary decrease in the output of the fuel cell, while suppressing abrupt changes of the voltage and the current value in the process of changing over the power generation state.

(2) In the fuel cell system of the above aspect, the controller may increase the decrement in the required amount of heat per unit time with an increase in voltage of the fuel cell, when the required output is equal to or higher than the reference value. When the required output is equal to or higher than the reference value, this configuration enables the power generation state to be changed over from the second power generation state to the first power generation state in a short time period, while suppressing a temporary decrease in the output of the fuel cell.

The invention may be implemented by any of various aspects other than the aspects of the fuel cell system described above, for example, a vehicle equipped with the fuel cell system or a control method of the fuel cell system.

DETAILED DESCRIPTION

A. Embodiment

Figure 1:
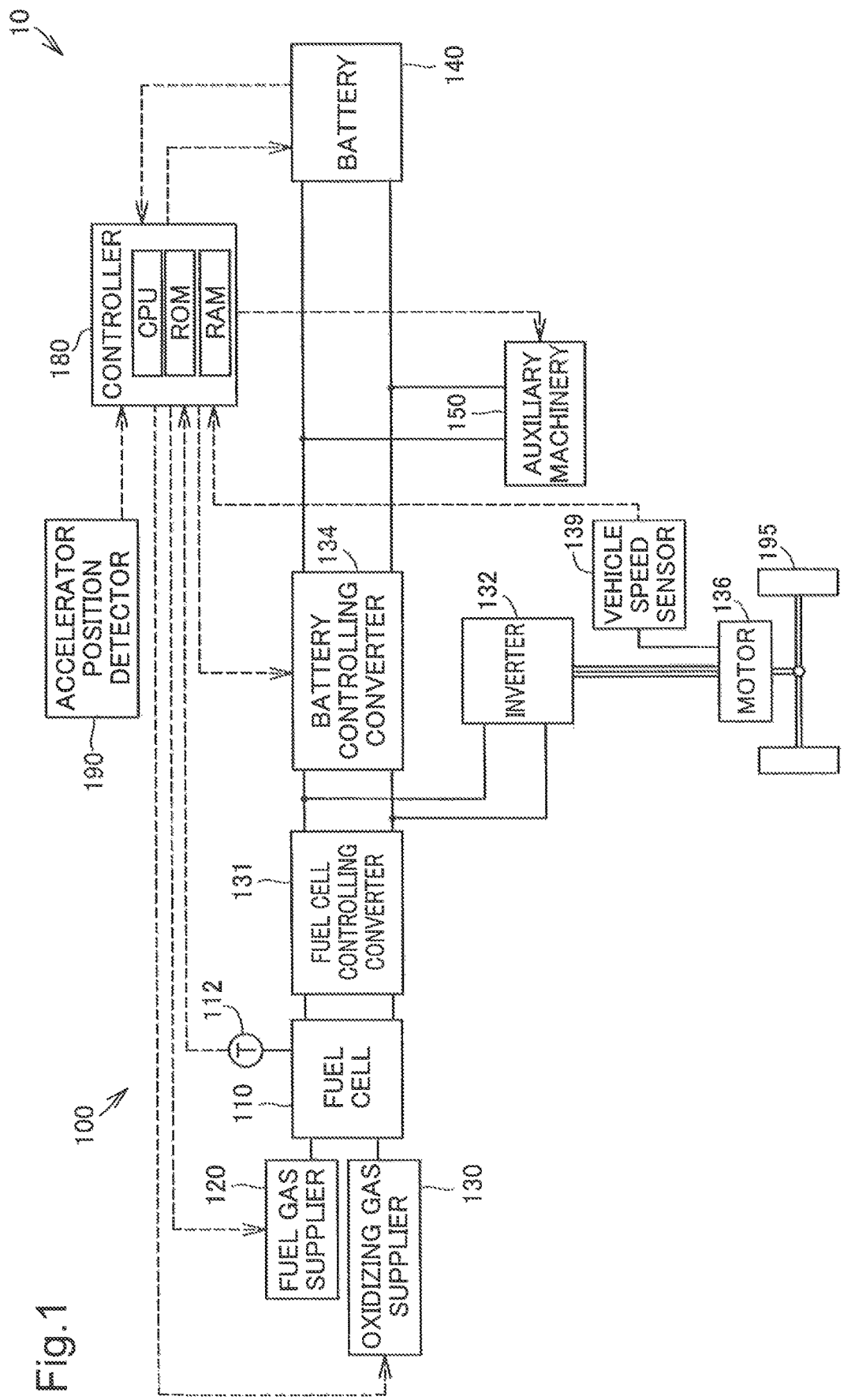
FIG. 1 is a schematic diagram illustrating the configuration of a fuel cell vehicle with a fuel cell system mounted thereon.

FIG. 1 is a schematic diagram illustrating the configuration of a fuel cell vehicle 10 with a fuel cell system 100 mounted thereon according to one embodiment of the invention. The fuel cell vehicle 10 includes a fuel cell 110, a temperature sensor 112, a fuel gas supplier 120, an oxidizing gas supplier 130, a fuel cell controlling converter 131, an inverter 132, a battery controlling converter 134, a traction motor 136, a vehicle speed sensor 139, a battery 140, auxiliary machinery 150, a controller 180, an accelerator position detector 190 and wheels 195. The fuel cell vehicle 10 runs with driving the traction motor 136 by electric power supplied from at least one of the fuel cell 110 and the battery 140. The fuel cell system 100 includes at least the fuel cell 110, the fuel cell controlling converter 131, the oxidizing gas supplier 130 and the controller 180 among the above components.

The fuel cell 110 is a polymer electrolyte fuel cell according to this embodiment. The fuel cell 110 has a stack structure by stacking a plurality of unit cells, each including a membrane electrode assembly (MEA), in series. A hydrogen gas is supplied as a fuel gas from the fuel gas supplier 120 to the anodes of the fuel cell 110. The air is supplied as an oxidizing as from the oxidizing gas supplier 130 to the cathodes of the fuel cell 110.

The fuel gas supplier 120 includes, for example, a hydrogen tank, various valves and an injector. The fuel gas supplier 120 supplies the fuel gas to the fuel cell 110 under control by the controller 180.

The oxidizing gas supplier 130 includes, for example, an air compressor and various valves. The oxidizing gas supplier 130 supplies the oxidizing gas to the fuel cell 110 under control by the controller 180. The oxidizing gas supplier 130 regulates the supply amount of the oxidizing gas in response to a command from the controller 180, in order to make the voltage of the fuel cell 110 equal to a predetermined value. With an increase in supply amount of the oxidizing gas, the voltage of the fuel cell 110 increases to an operating point on an I-V characteristic curve described later.

The temperature sensor 112 is a sensor configured to measure the temperature of the fuel cell 110. The temperature sensor 112 measures the temperature of a cooling medium that flows in the fuel cell 110, so as to measure the temperature of the fuel cell 110.

The fuel cell controlling converter 131 is configured by a DC-DC converter. The fuel cell controlling converter 131 is connected with the fuel cell 110 and changes the switching frequency of an internal switching element in response to a command from the controller 180 to regulate the current value of the fuel cell 110.

The battery controlling converter 134 is configured by a DC-DC converter. The battery controlling converter 134 is connected with the fuel cell 110 via the fuel cell controlling converter 131. The battery controlling converter 134 changes over the state of the battery 140 between a charging state and a discharging state in response to a command from the controller 180.

The battery 140 is an accumulator configured to accumulate electric energy generated by the fuel cell 110 and repeat charging and discharging. The battery 140 may be configured by, for example, a lithium ion battery. The battery 140 may, however, be another type of battery such as a lead acid battery, a nickel cadmium battery or a nickel metal hydride battery.

The inverter 132 converts a DC power obtained from at least one of the fuel cell 110 and the battery 140 into an AC power. The converted AC power is supplied to the traction motor 136.

The traction motor 136 is configured by a synchronous motor having three phase coils. The traction motor 136 receives the supply of AC power from the inverter 132 to drive the wheels 195. When a regenerative power is generated in the traction motor 136 by the rotation of the wheels 195, the regenerative power is converted into a DC power by the inverter 132 and is charged into the battery 140 via the battery controlling converter 134.

The vehicle speed sensor 139 is a sensor configured to detect the speed of the fuel cell vehicle 10. The vehicle speed sensor 139 detects the vehicle speed, based on the rotation speed of the traction motor 136. The detected vehicle speed is transmitted to the controller 180.

The accelerator position detector 190 detects the operation amount of an accelerator pedal provided at the driver's seat of the fuel cell vehicle 10. The detected accelerator operation amount is transmitted to the controller 180.

The controller 180 is configured as a computer including a CPU, a RAM, a ROM and interface circuits connected with the respective components described above. The CPU provided in the controller 180 loads and executes a control program stored in the ROM on the RAM to control power generation by the fuel cell 110, charging and discharging of the battery 140 and drive of the fuel cell vehicle 10. The controller 180 uses the fuel cell controlling converter 131 and the oxidizing gas supplier 130 to control the voltage and the current value of the fuel cell 110. According to this embodiment, with a view to controlling power generation by the fuel cell 110, the controller 180 uses the fuel cell controlling converter 131 to control the current value of the fuel cell 110 and uses the oxidizing gas supplier 130 to control the voltage of the fuel cell 110.

Figure 2:
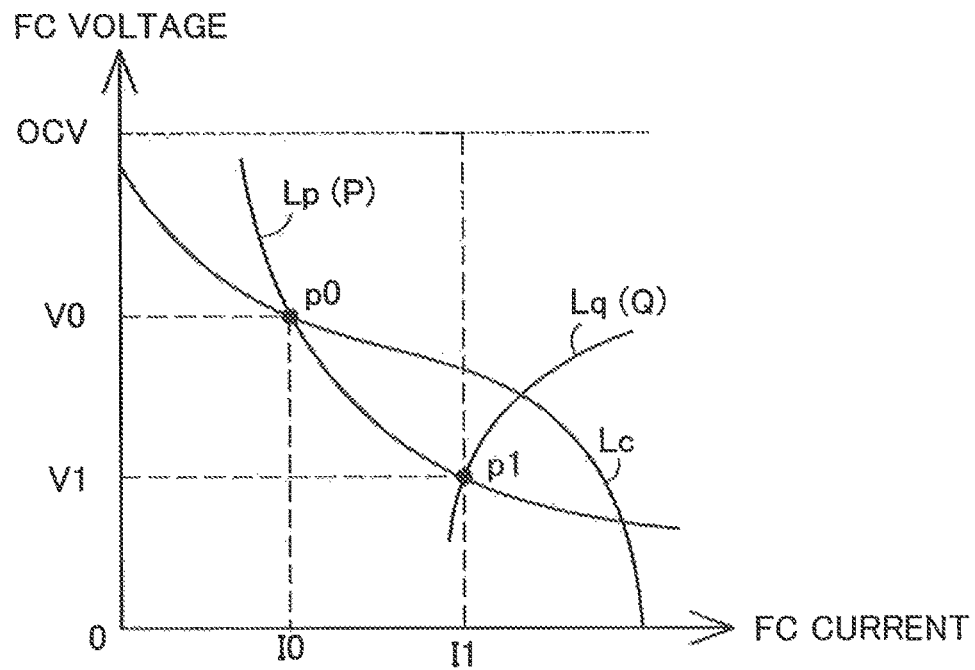
FIG. 2 is a diagram showing an I-V characteristic curve and operating points of a fuel cell.

FIG. 2 is a diagram showing an I-V characteristic curve Lc and operating points of the fuel cell 110. The controller 180 calculates a required output P according to the driver's accelerator operation amount detected by the accelerator position detector 190 and the vehicle speed of the fuel cell vehicle 10 detected by the vehicle speed sensor 139. FIG. 2 shows an equal-output curve Lp of the calculated required output P. The controller 180 sets the voltage and the current value of the fuel cell 110 according to the calculated required output P in the ordinary power generation state of the fuel cell 110, based on the I-V characteristic curve Lc of the high efficiency in the fuel cell 110.

According to this embodiment, in the ordinary power generation state, the controller 180 sets the voltage and the current value, such that the product of the voltage and the current value meets the required output P and the operating point of the fuel cell 110 is an operating point on the I-V characteristic curve. More specifically, the controller 180 sets the operating point of the fuel cell 110 to an operating point p0 (voltage V0, current value I0) at an intersection of the equal-output curve and the I-V characteristic curve Lc. When there are two or more intersections, the controller 180 sets the operating point of the fuel cell 110 to the operating point p0 (voltage V0, current value I0) at an intersection of the larger voltage. The controller 180 controls the oxidizing gas supplier 130 to regulate the amount of a reactive gas that is to be supplied to the fuel cell 110 and thereby adjust the voltage of the fuel cell 110 to the voltage V0 of the set operating point p0. The controller 180 also controls the fuel cell controlling converter 131 to adjust the current value of the fuel cell 110 to the current value I0 of the set operating point p0. In the ordinary power generation state, setting the voltage and the current value of the fuel cell 110 in this way ensures efficient power generation. The ordinary power generation state is also called first power generation state or high-efficiency power generation state.

When the temperature of the fuel cell 110 detected by the temperature sensor 112 is equal to or lower than a predetermined temperature (for example, 0° C.), the controller 180 sets the power generation state of the fuel cell 110 to a low-efficiency power generation state to warm up the fuel cell 110. More specifically, the controller 180 determines an amount of heat required to increase the temperature of the fuel cell 110 to a temperature suitable for power generation (for example, 70 to 90° C.) (required amount of heat Q), along with the required output P. FIG. 2 shows an equal-heat amount curve Lq of the required amount of heat Q. The controller 180 sets the voltage and the current value of the fuel cell 110 to a voltage and a current value that provide a lower power generation efficiency than the power generation efficiency in the ordinary power generation state, according to the required output P and the required amount of heat Q.

According to this embodiment, in the low-efficiency power generation state, the controller 180 sets the voltage and the current value, such that the product of the voltage and the current value meets the required output P and the product of a voltage difference (=OCV−V) from an open circuit voltage (OCV) of the fuel cell 110 and the current value meets the required amount of heat Q. In other words, the controller 180 sets the operating point of the fuel cell 110 in the low-efficiency power generation state to an operating point p1 (voltage V1, current value I1) at an intersection of the equal-output curve Lp and the equal-heat amount curve Lq. Setting the operating point of the fuel cell 110 to this operating point p1 causes the operating point of the fuel cell 110 to deviate from the characteristic curve Lc and provides a low voltage and a high current value. This increases the power generation loss and increases the amount of waste heat, based on the characteristic of the fuel cell 110. The controller 180 can thus quickly increase the temperature of the fuel cell 110 to warm up the fuel cell 110. The low-efficiency power generation state is also called second power generation state or quick warm-up state.

When the temperature of the fuel cell 110 increases to a suitable temperature in the low-efficiency power generation state of the fuel cell 110, the controller 180 changes over the power generation state from the low-efficiency power generation state to the ordinary power generation state. According to this embodiment, the controller 180 reduces the required amount of heat in the process of charging over the power generation state from the low-efficiency power generation state to the ordinary power generation state. More specifically, in the process of changing over the power generation state from the low-efficiency power generation state to the ordinary power generation state, the controller 180 reduces a decrement in the required amount of heat per unit time when the required output is equal to or higher than a reference value, compared with a decrement when the required output is lower than the reference value. In the description hereinafter, the process of changing over the power generation state from the low-efficiency power generation state to the ordinary power generation state is called power generation state changeover process.

Figure 3:
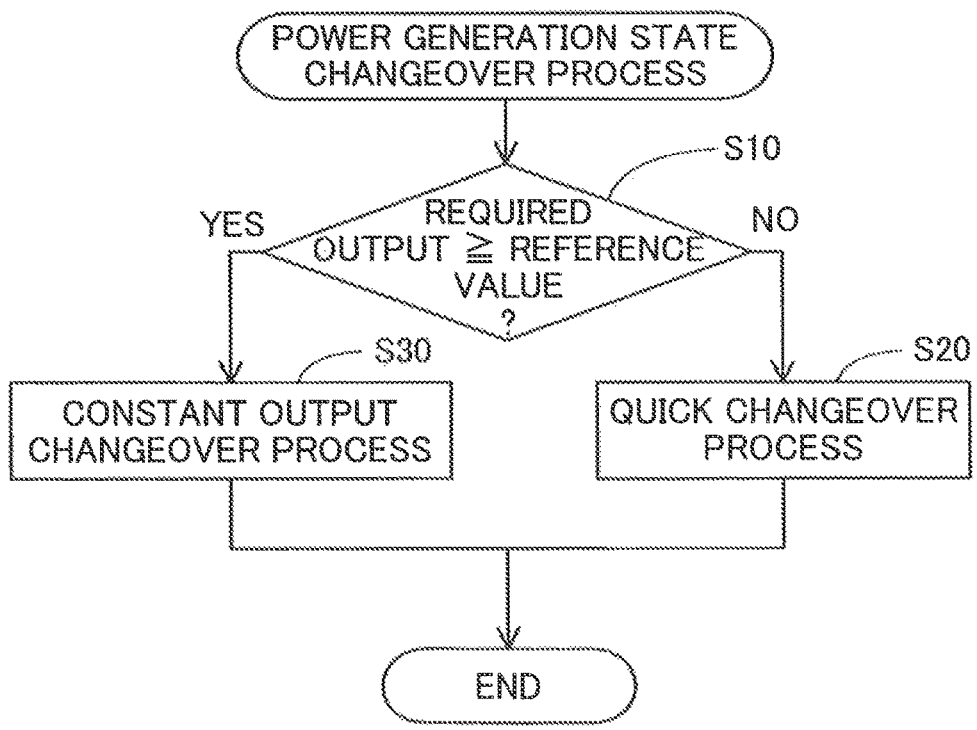
FIG. 3 is a flowchart showing a power generation state changeover process.

FIG. 3 is a flowchart showing the power generation state changeover process performed by the controller 180. This power generation state changeover process is triggered by detection that the temperature of the fuel cell 110 increases to the suitable temperature in the low-efficiency power generation state of the fuel cell 110.

On the start of the power generation state changeover process, the controller 180 first determines whether the required output is equal to or higher than a reference value (step S10). According to the embodiment, this reference value is determined based on a required output when the fuel cell vehicle 10 is stopped or based on a low output such as not to cause the driver and the passengers of the fuel cell vehicle 10 to recognize an output variation caused by the changeover of the power generation state, if applicable. The reference value may be determined in advance by experiment.

When it is determined at step S10 that the required output is lower than the reference value (step S10: NO), the controller 180 performs a quick changeover process (step S20). When it is determined at step S10 that the required output is equal to or higher than the reference value (step S10: YES), on the other hand, the controller 180 performs a constant output changeover process (step S30).

Figure 4A:
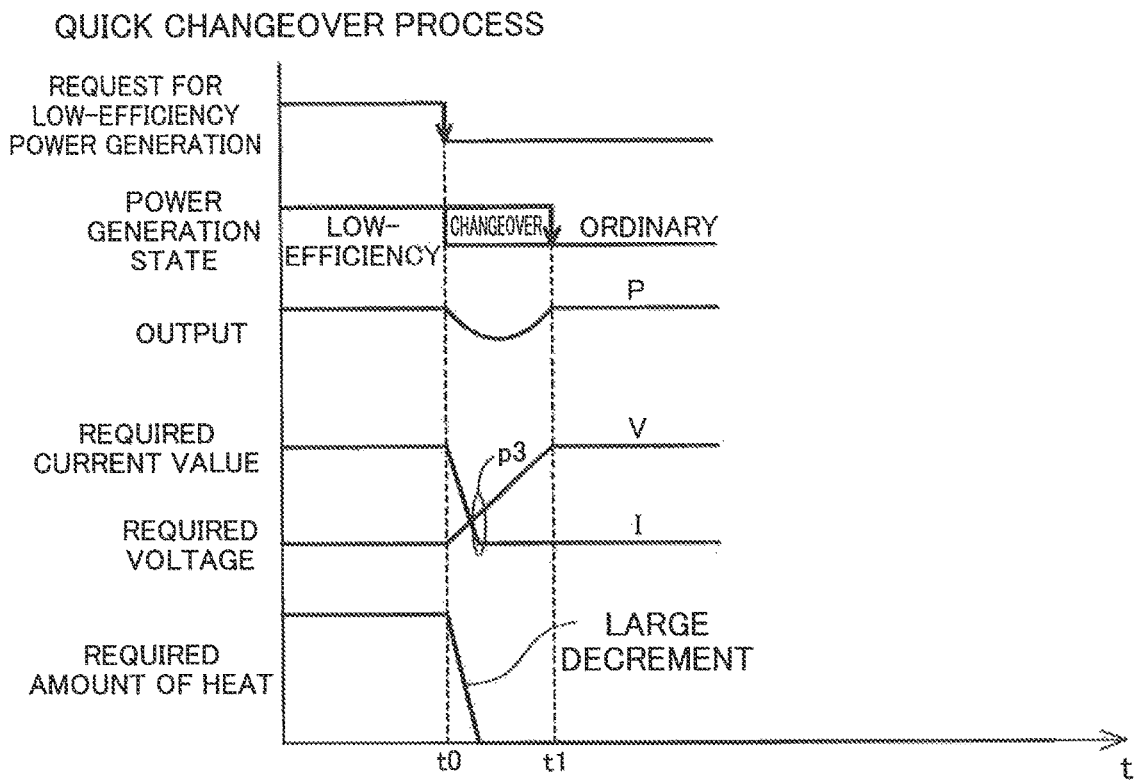
FIG. 4A is a timing chart of a quick changeover process.
Figure 4B:
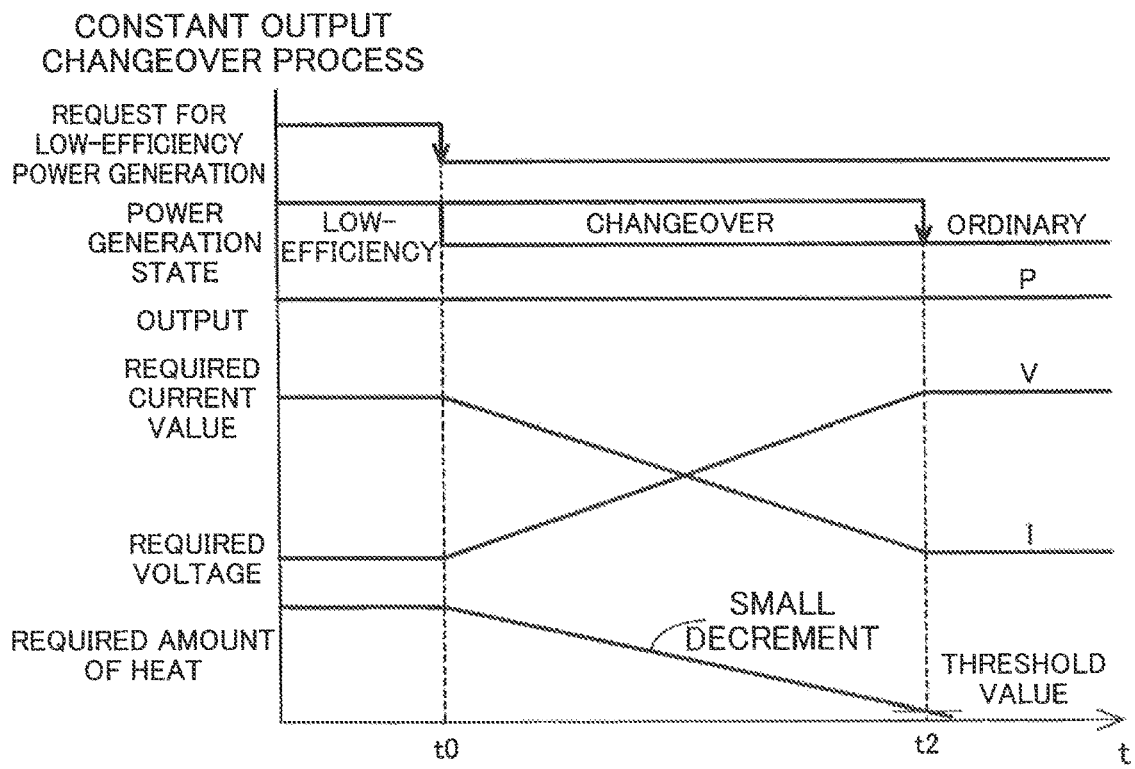
FIG. 4B is a timing chart showing a constant output changeover process.
Figure 5:
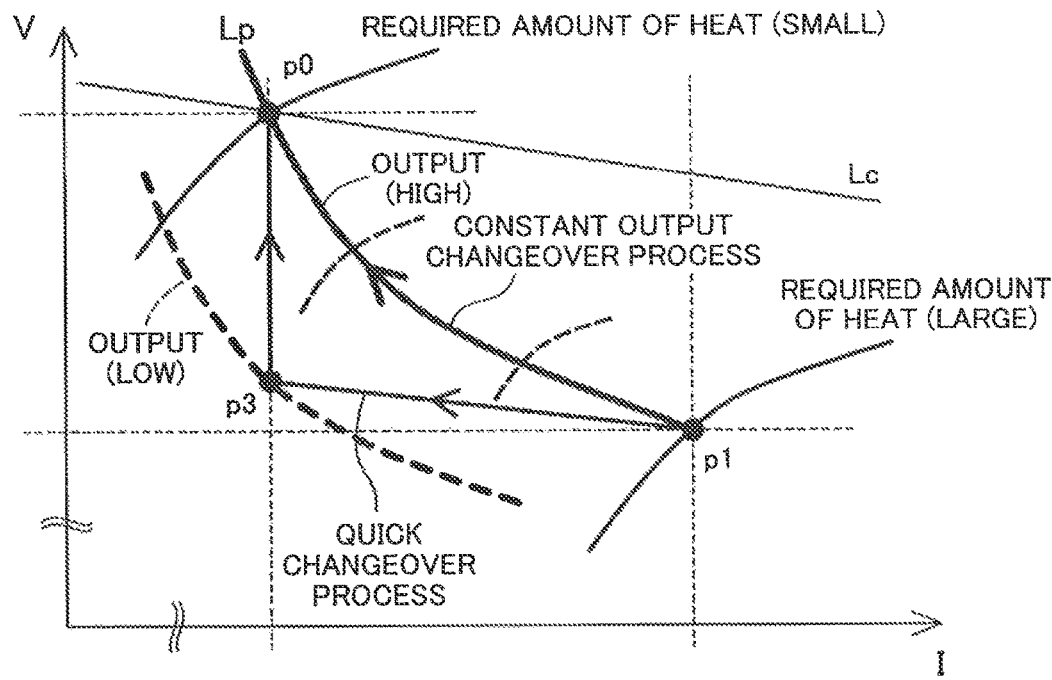
FIG. 5 is a diagram illustrating shifts of an operating point in the quick changeover process and in the constant output changeover process.

FIG. 4A is a timing chart of the quick changeover process. FIG. 4B is a timing chart of the constant output changeover process. FIG. 5 is a diagram illustrating shifts of the operating point in the quick changeover process and in the constant output changeover process.

As shown in FIG. 4A, in the quick changeover process, when the temperature of the fuel cell 110 increases to the suitable temperature and a request for low-efficiency power generation is cancelled, the controller 180 starts quickly decreasing the required amount of heat to zero at a timing t0. The controller 180 also gradually increases a required voltage directed to the fuel cell controlling converter 131 to a target voltage. Abruptly increasing the required voltage is likely to cause excessive current to flow in the fuel cell controlling converter 131 according to the properties of the fuel cell controlling converter 131. The controller 180, on the other hand, quickly decreases the required current value. The phenomenon that causes excessive current to flow in a DC-DB converter such as the fuel cell controlling converter 131 is described in, for example, JP 2009-158162A (applicant: Toyota Motor Corporation). An increment in voltage per unit time is determined in advance, based on an increment that does not cause excessive current to flow in the fuel cell controlling converter 131. When the voltage reaches the target voltage at a timing t1, changeover of the power generation state is completed.

In the quick changeover process according to the timing chart of FIG. 4A, the operating point of the fuel cell 110 shifts from the operating point p1 in the low-efficiency power generation state via an operating point p3 to the operating point p0 in the ordinary power generation state as shown in FIG. 5. The operating point p3 provides the same current value as that at the target operating point p0 in the ordinary power generation state but provides only a little increase of the voltage from the voltage of the operating point p1 in order to protect the fuel cell controlling converter 131. In other words, the quick changeover process has a lower rate of change in the voltage, compared with a rate of change in the current value per unit time. In the quick changeover process, after the operating point is shifted to the operating point p3, the voltage is gradually increased. Eventually, the operating point is shifted to the operating point p0 on the I-V characteristic curve Lc, so that the power generation state is changed over to the ordinary power generation state.

In the quick changeover process, shifting the operating point from p1 to p3 and then to p0 changes the current-voltage relationship from the low voltage and high current state (operating point p1) to the low voltage and low current state (operating point p3) and eventually to the high voltage and low current state (operating point p0). This temporarily decreases the output of the fuel cell 110 around the operating point p3 of the low voltage and low current state as shown in FIG. 4A. According to this embodiment, however, this quick changeover process is performed when the required output is lower than the reference value as described above, i.e., when the required output is an output when the fuel cell vehicle 10 is stopped or is a low output such as not to cause the driver and the passengers of the fuel cell vehicle 10 to recognize an output variation, if applicable. Even when the output is temporarily decreased with changeover of the power generation state, this does not deteriorate the drivability of the fuel cell vehicle 10.

As shown in FIG. 4B, in the constant output changeover process, when the temperature of the fuel cell 110 increases to the suitable temperature and a request for low-efficiency power generation is cancelled, the controller 180 gradually decreases the required amount of heat after a timing t0. In other words, the controller 180 sets a smaller decrement in the required amount of heat per unit time in the constant output changeover process than the decrement in the quick changeover process. The controller 180 gradually increases the required voltage and simultaneously gradually decreases the required current value, while gradually decreasing the required amount of heat. When the required amount of heat is decreased to or below a predetermined threshold value at a timing t2, the controller 180 stops power generation control using the required amount of heat, so as to complete the changeover of the power generation state. The threshold value is a value that does not significantly affect the output by the changeover of the power generation state, such as a value of 1/10 of the required amount of heat at the timing t0. The threshold value may be determined in advance by experiment.

In the constant output changeover process according to the timing chart of FIG. 4B, as the required amount of heat gradually decreases, the operating point of the fuel cell 110 is smoothly changeable on the equal-output curve Lp from the operating point p1 in the low-efficiency power generation state to the operating point p0 in the ordinary power generation state, as shown in FIG. 5. This changes over the power generation state, while keeping the output constant and suppressing abrupt increases of the voltage and electric current.

The fuel cell system 100 of the embodiment described above selects either the quick changeover process or the constant output changeover process according to the required output when changing over the power generation state from the low-efficiency power generation state to the ordinary power generation state. When the required output is lower than the reference value, the quick changeover process is performed. This quickly changes over the power generation state to the ordinary power generation state, for example, in the vehicle stopped. This can immediately enhance the power generation efficiency and improve the fuel consumption performance. When the required output is equal to or higher than the reference value, on the other hand, the constant output changeover process is performed to reduce the decrement in the required amount of heat per unit time. The constant output changeover process requires the longer time period for changing over the power generation state than the quick changeover process, but suppresses abrupt changes of the voltage and the current value and also suppresses a temporary decrease in output of the fuel cell 110. This results in suppressing a torque shock from occurring in the fuel cell vehicle 10 with the changeover of the power generation state and thereby suppresses deterioration of the drivability.

B. Modifications

Modification 1

Figure 6:
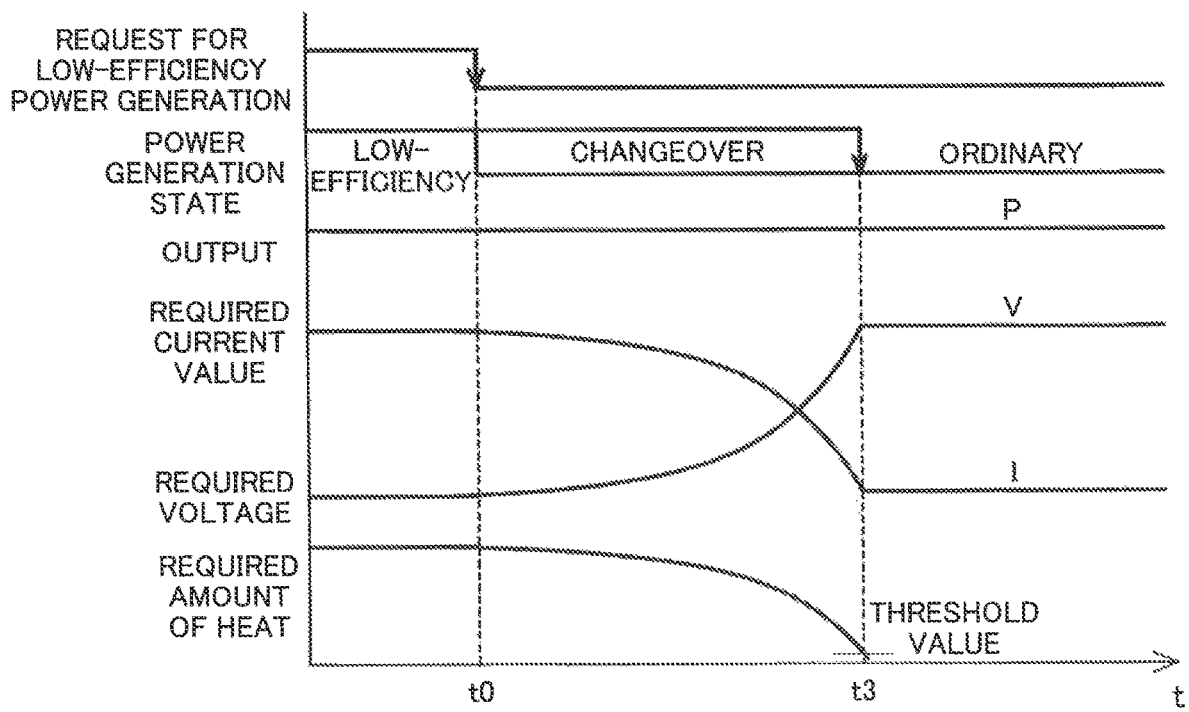
FIG. 6 is a timing chart showing a modification of the constant output changeover process.

FIG. 6 is a timing chart showing a modification of the constant output changeover process. In this modification, the controller 180 increases the decrement in the required amount of heat per unit time with an increase in voltage in the constant output changeover process. Controlling the decrement in the required amount of heat per unit time in this manner enables the operating point to be readily shifted along the equal-output curve Lp (as shown in FIG. 5). When the required output is equal to or higher than the reference value, this modification enables the power generation state to be changed over from the low-efficiency power generation state to the ordinary power generation state in a short time period, while suppressing a temporary decrease in output of the fuel cell 110.

Modification 2

According to the embodiment described above, the controller 180 compares the required output with the reference value to select either the quick changeover process or the constant output changeover process in the power generation changeover process. According to a modification, the controller 180 may perform the quick changeover process irrespective of the required output when the fuel cell vehicle 10 is stopped. This is because a temporary decrease of the output does not deteriorate the drivability when the fuel cell vehicle 10 is stopped.

Modification 3

According to the embodiment described above, the controller 180 compares the required output with the reference value to select either the quick changeover process or the constant output changeover process in the power generation changeover process. According to a modification, the controller 180 may perform the constant output changeover process irrespective of the required output in the power generation changeover process. This suppresses a temporary decrease of the output with the changeover of the power generation state, irrespective of the operating condition of the fuel cell vehicle 10.

Modification 4

According to the embodiment described above, the controller 180 determines whether the power generation state is to be changed, based on the temperature of the fuel cell 110. According to a modification, the controller 180 may determine whether the power generation state is to be changed, based on, for example, the ambient temperature or the temperature of the auxiliary machinery 150.

Modification 5

In the embodiment described above, the required amount of heat for warming up the fuel cell 110 may be a predetermined fixed value or may be dynamically calculated based on a difference between the temperature detected by the temperature sensor 112 and the suitable temperature of the fuel cell 110. An amount of heat required for warming up the fuel cell vehicle 10 may be added to the required amount of heat.

Modification 6

According to the embodiment described above, the controller 180 controls the operating point of the voltage and the current value of the fuel cell 110 to the operating point on the I-V characteristic curve Lc in the ordinary power generation state. According to a modification, the controller 180 may not strictly limit the controlled operating point to the operating point on the I-V characteristic curve Lc but may control the operating point in a range that does not significantly deviate from the characteristic curve Lc.

Modification 7

The configuration of the above embodiment uses the oxidizing gas supplier 130 to regulate the voltage of the fuel cell 110 and uses the fuel cell controlling converter 131 to regulate the electric current of the fuel cell 110. This configuration is, however, not essential. A modified configuration may use the oxidizing gas supplier 130 to regulate the electric current and use the fuel cell controlling converter 131 to regulate the voltage.

Modification 8

In the embodiment described above, the fuel cell system 100 is mounted on the fuel cell vehicle 10. The fuel cell system 100 may, however, be mounted on another moving body such as aircraft or boat or ship. The fuel cell system 100 may also be installed in a building or at a land as a power source for household use or for business use.

The invention is not limited to any of the embodiment and the modifications described above but may be implemented by a diversity of other configurations without departing from the scope of the invention. For example, the technical features of any of the embodiment and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A fuel cell vehicle including a fuel cell system, comprising:
   an accelerator position detector configured to detect an operation amount of an accelerator pedal;
   a fuel cell;
   a fuel cell controlling converter that is connected with the fuel cell;
   an oxidizing gas supplier that is configured to supply an oxidizing gas to the fuel cell; and
   a controller that is configured to control a voltage and a current value of the fuel cell by using the fuel cell controlling converter and the oxidizing gas supplier, wherein
   the controller is configured to calculate a required output of the fuel cell using the operation amount detected by the accelerator position detector,
   in a first power generation state, the controller is configured to set the voltage and the current value of the fuel cell according to the required output, based on a current-voltage characteristic of the fuel cell,
   in a second power generation state, the controller is configured to set the voltage and the current value of the fuel cell according to the required output and a required amount of heat, to a voltage and a current value that provide a lower power generation efficiency than a power generation efficiency in the first power generation state,
   in a changeover state, which is a state based on a reduced required amount of heat, the controller is configured to reduce the required amount of heat in a process of changing over a power generation state from the second power generation state to the first power generation state, and
   in the process of changing over the power generation state from the second power generation state to the first power generation state, the controller is configured to reduce a decrement in the required amount of heat per unit time when the required output is equal to or higher than a reference value, compared with a decrement when the required output is lower than the reference value, and to gradually lower the current value and gradually increase the voltage during a period of reducing the decrement, such that an output generated by the fuel cell is substantially constant.

2. The fuel cell vehicle according to claim 1, wherein the controller is configured to increase a rate of reduction of the decrement in the required amount of heat per unit time with an increase in voltage of the fuel cell, when the required output is equal to or higher than the reference value.

3. The fuel cell vehicle according to claim 1, wherein in the process of changing over the power generation state from the second power generation state to the first power generation state, the controller is configured to:
   decrement the required amount of heat per unit time in a quick changeover process when the required output is greater than or equal to the reference value; and
   decrement the required amount of heat per unit time in a constant output changeover process when the required output is less than the reference value, and
   wherein the controller is configured to lower the current value in the constant output changeover process more gradually than in the quick changeover process, and increase the voltage in the constant output changeover process more gradually than in the quick changeover process.

* * * * *